US010471691B2

(12) United States Patent
Zhou et al.

(10) Patent No.: US 10,471,691 B2
(45) Date of Patent: Nov. 12, 2019

(54) PRINTABLE MEDIA

(71) Applicant: Hewlett-Packard Development Company, L.P., Fort Collins, CO (US)

(72) Inventors: Xiaoqi Zhou, San Diego, CA (US); Paul C. Landrum, San Diego, CA (US); Xulong Fu, San Diego, CA (US); Francois K. Pirayesh, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 31 days.

(21) Appl. No.: 15/741,925

(22) PCT Filed: Sep. 29, 2015

(86) PCT No.: PCT/US2015/052871

§ 371 (c)(1),
(2) Date: Jan. 4, 2018

(87) PCT Pub. No.: WO2017/058159

PCT Pub. Date: Apr. 6, 2017

(65) Prior Publication Data

US 2019/0070834 A1 Mar. 7, 2019

(51) Int. Cl.

*B41M 5/00* (2006.01)
*B32B 27/12* (2006.01)

(Continued)

(52) U.S. Cl.

CPC ................ *B32B 27/12* (2013.01); *B05D 1/00* (2013.01); *B05D 5/02* (2013.01); *B41M 3/18* (2013.01);

(Continued)

(58) Field of Classification Search

CPC ............ B05D 1/00; B05D 5/02; B41M 5/502; B41M 5/504; B41M 5/508; B41M 5/5218; B41M 5/5245; B41M 5/5281

See application file for complete search history.

(56) References Cited

U.S. PATENT DOCUMENTS 4,489,188 A 12/1984 Jones et al.
5,209,985 A 5/1993 Ueda et al.

(Continued)

FOREIGN PATENT DOCUMENTS

CN 1044258 8/1990
CN 1122395 5/1996

(Continued)

OTHER PUBLICATIONS

Extended European Search Report dated Jun. 14, 2018 for PCT/US2015/052871, Applicant Hewlett-Packard Company, L.P. Development.

(Continued)

*Primary Examiner* — Betelhem Shewareged

(74) *Attorney, Agent, or Firm* — Thorpe North & Western LLP

(57) ABSTRACT

A printable media comprising a supporting substrate, including fibers, having an image side and a non-image side, which contains an image receiving layer coated on the image side of the supporting substrate. The image receiving layer comprises pigment fillers, polymeric binders and ink optical density enhancement agents. Also disclosed is a method for producing the textured media.

19 Claims, 2 Drawing Sheets

(51) Int. Cl.

| | |
|---|---|
| ***B05D 1/00*** | (2006.01) |
| ***B05D 5/02*** | (2006.01) |
| ***B41M 5/50*** | (2006.01) |
| ***B41M 5/52*** | (2006.01) |
| ***B41M 3/18*** | (2006.01) |

(52) U.S. Cl.

CPC ............ *B41M 5/502* (2013.01); *B41M 5/508* (2013.01); *B41M 5/52* (2013.01); *B41M 5/5218* (2013.01); *B41M 5/504* (2013.01); *B41M 5/529* (2013.01); *B41M 5/5236* (2013.01); *B41M 5/5245* (2013.01); *B41M 5/5254* (2013.01); *B41M 5/5263* (2013.01); *B41M 5/5281* (2013.01); *B41M 2205/34* (2013.01)

(56) References Cited

U.S. PATENT DOCUMENTS

| | | | |
|---|---|---|---|
| 5,236,987 | A | 8/1993 | Arendt |
| 5,709,976 | A | 1/1998 | Malhotra |
| 6,261,669 | B1 | 7/2001 | Yang et al. |
| 6,358,668 | B1 | 3/2002 | Leenders et al. |
| 7,696,262 | B2 | 4/2010 | Cagle et al. |
| 8,389,075 | B2 | 3/2013 | Looman et al. |
| 8,563,100 | B1 | 10/2013 | Zhou et al. |
| 8,916,243 | B2 | 12/2014 | Fu et al. |
| 8,962,111 | B2 | 2/2015 | Zhou et al. |
| 10,131,173 | B2 * | 11/2018 | Zhou ...................... B41M 5/508 |
| 2003/0175450 | A1 * | 9/2003 | Obayashi ................ B32B 27/10 428/32.1 |
| 2010/0260939 | A1 | 10/2010 | Foley |
| 2012/0148768 | A1 | 6/2012 | Simpson et al. |
| 2012/0237699 | A1 | 9/2012 | Alfekri et al. |

FOREIGN PATENT DOCUMENTS

| | | |
|---|---|---|
| CN | 1213343 | 4/1999 |
| CN | 1368917 | 9/2002 |
| CN | 1582234 | 2/2005 |
| CN | 1802263 | 7/2006 |
| CN | 102602188 | 7/2012 |
| CN | 104053554 | 9/2014 |
| EP | 2050784 | 4/2009 |
| JP | H08164665 | 6/1996 |
| JP | H11200250 | 7/1999 |
| JP | 2004230883 | 8/2004 |
| JP | 2015058661 | 3/2015 |
| WO | 03033606 | 4/2003 |
| WO | 2013015767 | 1/2013 |
| WO | 2014120149 | 8/2014 |
| WO | 2015009271 | 1/2015 |
| WO | 2015117910 | 8/2015 |

OTHER PUBLICATIONS

International Search Report dated Jun. 21, 2016 for PCT/US2015/052871, Applicant Hewlett-Packard Development Company, L.P.

* cited by examiner

PRINTABLE MEDIA

BACKGROUND

Inkjet printing technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of printable media. Inkjet printing technology has found various applications on different substrates including, for examples, cellulose paper, metal, plastic, fabric, and the like. The substrate plays a key role in the overall image quality and permanence of the printed images.

Large format print media becomes more and more popular and finds use in many applications such as wall coverings, banners, and signs of many types that can be printed to create images with one or more symbols, text and photographs. When printing on such substrates, challenges exist due to their specific nature. Accordingly, investigations continue into developing printable media that can be effectively used for large format printing and/or for wall coverings and which impart good printing performances.

BRIEF DESCRIPTION OF THE DRAWING

The drawings illustrate various examples of the present printable media and are part of the specification.

DETAILED DESCRIPTION

Figure 1:
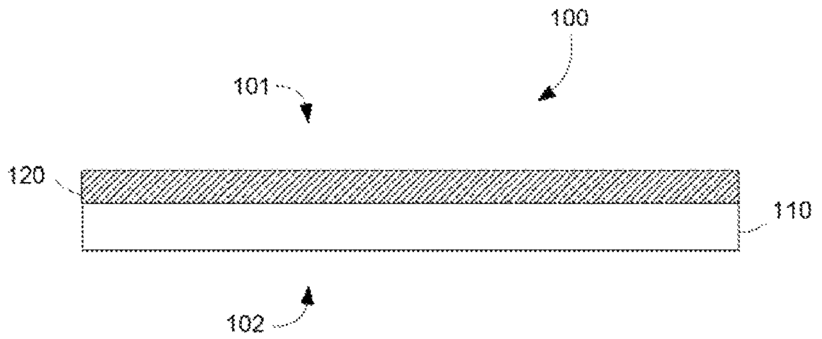
FIGS. 1, 2, 3 and 4 are cross-sectional views of the printable media according to examples of the present disclosure.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percent are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The present disclosure refers to a printable recording media, or printable media, comprising a supporting substrate, with an image side and a non-image side, including fibers and an image receiving layer that is coated on the image side of the supporting substrate. The image receiving layer comprises pigment fillers, polymeric binders and ink optical density enhancement agents. Also disclosed herein is a method for making the printable media.

The printable media, as disclosed herein, can be used as a wall covering material (e.g., wallpaper) for home or commercial use, for decoration or display as well as signs or banners and the like. In some examples, the printable media of the present disclosure is a wall covering substrate. In some other examples, the printable media is a wall covering substrate that contains a multi-layer composite structure. The printable media includes layers that form a non-image side and an image side on the printable media. The non-image side, or backside, is the side that would face and attach to a wall, in a wall covering application, or even in a sign or banner application having a single image side. The image side is the side that includes material layers to receive, support and protect an image. The term "wall covering," as used herein, means a large format print media that has a length that is much larger than a width (or vice versa) relative to small format office paper or photo media products (e.g., letter, A4, legal, etc. sizes). For example, the wall covering may be provided in a roll that is 1.37 meters (54 inches) wide and 27.43 meters (30 linear yards) long. Moreover, the term "wall covering" means a print media that supports various imaging materials and applications, for example, various types of inkjet inks and inkjet printing for image formation. In addition, the term "wall covering" means a product that complies with federal and industry standards or specifications for wall coverings including, but may not be limited to, CCC-W-408A and D, ASTM F793 and CFFAW-101D. Under these standards, wall coverings have weight and durability requirements depending on which category or type that the wall covering falls within. Category I is for decorative only wall covering, while Category VI is for commercial serviceability wall covering. (Types I, II and III wall coverings are substantially equivalent to Categories, IV, V and VI, respectively, among the standards). In some examples, the printable media of the present disclosure, when used a wall covering, have a durability that may meet or exceed Type-II, commercial serviceability wall covering standards or specifications, to provide a durable Type-II wall covering that is also free of polyvinyl chloride (PVC) (which is harmful to the environment).

In some other examples, the printable media, when used a wall covering in an in-door environmental, is able to meet "Fire Resistance or flame resistance" standards such as ASTM E84 for example. In yet some other examples, the printable media, when used in a wall covering application, has a mechanical breaking strength that is within a range of at least 50 lb to about 60 lb; or within a range of about 55 lb to about 60 lb. The mechanical breaking strength in the Machine Direction (MD) can be between about 58 lb and about 60 lb and in the Cross Machine Direction (CMD) can be between about 55 lb to about 58 lb. Such measurements are made according to the ASTM D751 "Standard test method for coated fabrics". The printable media, when used in a wall covering application, can have a minimum scrubbability resistance of 300 cycles, or maybe more, of linear abrasion. Such measurements are made according to the ASTM F793 “Standard test method for coated fabrics”.

In some example, the printable media can be used as an inkjet printable media. The printable media can be thus specifically designed to receive any inkjet printable ink, such as, for example, organic solvent-based inkjet inks or aqueous-based inkjet inks. Examples of inkjet inks that may be deposited, established, or otherwise printed on the printable media, include pigment-based inkjet inks, dye-based inkjet inks, pigmented latex-based inkjet inks, and UV curable inkjet inks. In some examples, the printable media is an inkjet printable media that is very well adapted to latex-based inkjet inks. The printable recording media, described herein, provides printed images and articles that demonstrate excellent image quality (such as vivid image color reproduction, rich color gamut, low ink bleed and low image coalescence performance). The images printed on the printable media will have excellent durability; specifically, they will have excellent durability under mechanical actions such as rubbing and scratching.

The printable media of the present disclosure can be a smooth or a textured media. In some examples, the printable media is a textured media. In some other examples, the supporting substrate and the image receiving layer form a textured surface on the image side of the printable media. The wording “textured” refers to the external and visual aspect of the media. The textured aspect is due to the fact that, at least, the supporting substrate and/or the image receiving layer are textured surfaces. By textured media, it is meant also herein a media that has been embedded and that presents a macroscopically textured surface. The textured surface is thus not smooth and has apparent physical features (that can be represented as “peaks” and “valleys”). The textured media can be considered as having a two-dimensional and three-dimensional designs that can be distinguished by its perceived physical properties. The texture of the media has a physical texture that results from physical variations upon the media surface. Such “physical texture” differentiates from “visual texture” by having a physical quality that can be felt by touch. The physical surface texture of the media affects the smoothness of the media. The textured media can be created by embossing and un-embossing techniques. Such embossing and un-embossing techniques are the processes of creating either raised or recessed relief images and designs in paper and other materials. An embossed pattern is raised against the background, while an un-embossed pattern is sunken into the surface of the material. In some examples, the textured media is a media that has been embossed. Said embossed media is capable of retaining all of its inherent imaging and performance properties. The textured media can be obtained by embossing a pattern into media via passing said media between rollers with patterned surface. The technique for embossing a texture, pattern and/or design onto a media can involve molding the surface of a media by forcing it between a pressure nip formed by embossing rollers. The textured printable media can also be obtained by using embossing cylinders that may be mechanically or chemically etched with a specific pattern and/or design. The textured media can be created using an embossing roller under pressure. The media is altered during texturing by creating embossed depths ranging from about 5 μm to about 150 μm. The Parker Print Surface (PPS) roughness can vary from about 0.45 μm to about 12 μm at 1600 psi pressure on the embossing roll. The load and depth of pattern increase the surface roughness. The Confocal microscope surface roughness increased from 10 Rz (mic) to 50 Rz (mic). The static coefficient of friction does not change but the kinetic coefficient of friction slightly decrease as the surface area is reduced. In some examples, the surface roughness of the printable media is greater than 5 μm per PPS method.

Figure 2:
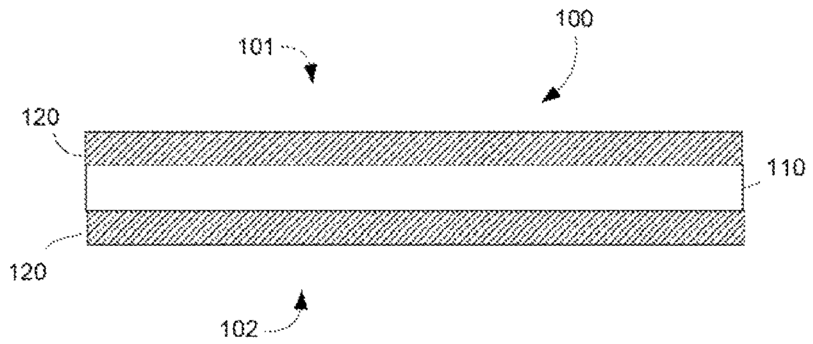

FIG. 1 schematically illustrates an example of a printable media (100) of the present disclosure. It is to be understood that the thickness of the various layers is exaggerated for illustrative purposes. The printable media (100) has an image or printed side (101) and a backside or opposing side (102). The image side (101) of the media is the side that includes material layers that will receive, support and protect an image. The backside, or opposing side, (102) is not designed for receiving printed image and is the side that would face and attach to a subject such as a panel, a board and a wall surface in a wall covering application, or even in a sign or banner application. As illustrated in FIG. 1, the printable recording media (100) encompasses a supporting substrate (110), above which is applied, at least, an image receiving layer (120). The image receiving layer (120) is applied on the image side (101) of the supporting substrate (110). The image receiving layer is thus applied on one side only and no other coating is applied on the opposite side. In some other examples, such as illustrated in FIG. 2, the image receiving layer (120) is applied to both opposing sides of the substrate (110). The double-side coated media has thus a sandwich structure, i.e. both sides of the substrate (110) are coated and both sides may be printed. If the coated side is used as an image-receiving side, the other side, i.e. backside, may not have any coating at all, or may be coated with coatings to meet certain features such as to balance the curl of the final product.

Figure 3:
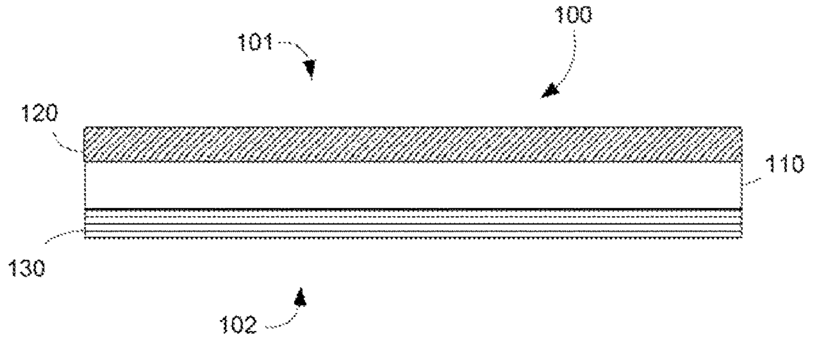

FIG. 3 illustrates a side view of another example of the printable media (100) in accordance with some examples described herein. In such examples, the printable media (100) contains a base substrate (110), an image receiving layer (120) coated on the image side (101) of the base substrate (110) and contains also a barrier layer or back side layer (130) coated on the backside (102) of the composite supporting base substrate (110).

Figure 4:
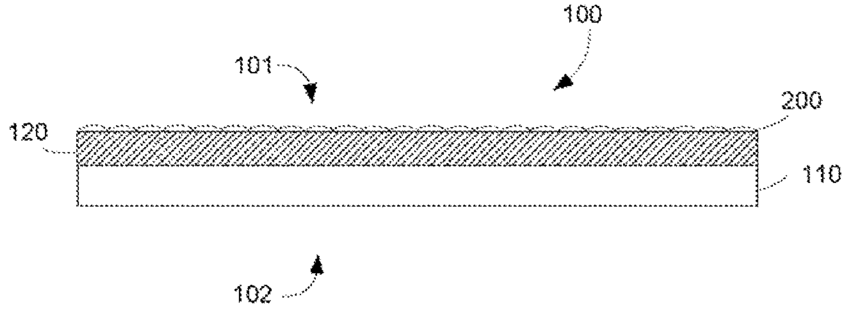

FIG. 4 illustrates a side view of another example of the printable media (100), in accordance with the examples described herein, wherein the supporting substrate (110) and the image receiving layer (120) form a textured surface (200) on the image side (101) of the media. FIG. 4 schematically exemplifies the structure of the textured surface (200) that is created on the external surface of the image receiving layer (120). The textured surface (200) can be consider as creating “peaks” and “valleys” on the external surface of the image receiving layer.

Figure 5:
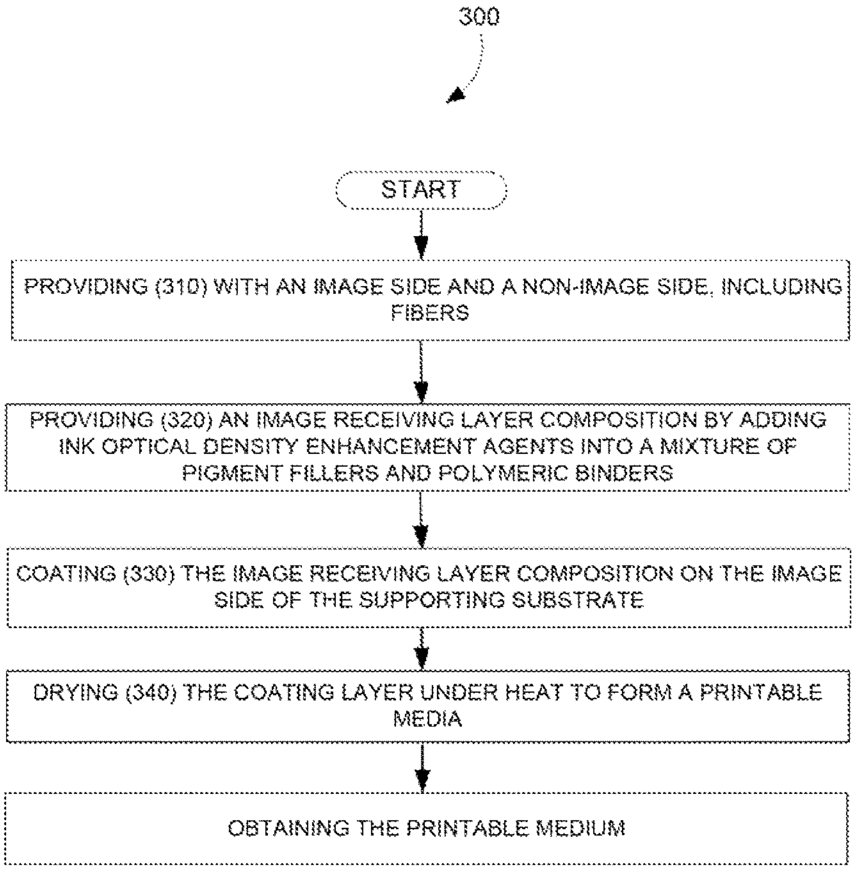
FIG. 5 is a flowchart illustrating the method for making the printable media according to some examples of the present disclosure.

FIG. 5 is a flowchart illustrating an example of a method for making the printable media such as described herein. Such method (300) encompasses: providing (310) a supporting substrate, with an image side and a non-image side, including fibers; providing (320) an image receiving layer composition by adding ink optical density enhancement agents into a mixture of pigment fillers and polymeric binders; coating (330) the image receiving layer composition on the image side of the supporting substrate; and drying (340) the coating layer under heat to form a printable media.

The Supporting Substrate

The printable media, or print medium, which can also be called herein printable recording media, according to the present disclosure, comprises a supporting substrate (also referred as base substrate) (110). The word “supporting” refers to a physical objective of the substrate which is to carry the coating layer(s) and the image(s) that are going to be printed with any desired geometry and size with excellent durability or mechanical strength. In some examples, the supporting substrate is a composite supporting substrate. The word "composite" refers herein to a material made from at least two constituent material layers, or layers, that have different physical and/or chemical properties from one another, and wherein these constituent materials/layers remain separate at a molecular level and distinct within the structure of the composite.

In some examples, the supporting substrate (110) is durable and flexible substrate. By "flexible", it is meant pliant or pliable and able to be rolled and unrolled without breaking or cracking, for example. By "durable", it is meant that the supporting substrate has a high tolerance to certain physical forces and surface degradation forces. The durability of the supporting substrate is manifested according to one or more of tear and tensile strength, surface abrasion, water and solvent resistance, fire resistance, dimensional stability, stain resistance, heat ageing, cold climate, and others described in the wall covering classification standards ASTM F793 and Federal Specification CCC-W-408D, for example, for Type II commercial serviceability wall coverings. The supporting substrate (110) may be porous or non-porous.

The supporting substrate includes fibers. The fibers can be seen as the main component of the substrate. The substrate could also be seen as being a "composite fabric": a fabric that comprises several other ingredients such as, for examples, particulate inorganic substances, internal sizing agent and/or polymeric substances.

The fibers can be made of natural fiber including natural cellulose fiber from either hardwood species or hardwood species and softwood species. In some examples, a ratio of hardwood fiber to softwood fiber can be within a range of about 100:0 to about 50:50. In some other examples, the supporting substrate contains fibers that are originating from wooded resource and that have more than 5% of fiber fines which have an average length that is less than 0.1 mm. In yet some other examples, the supporting substrate contains fibers, from wooded resource, that have at least 10% of fiber fines with an average length of less than 0.1 mm. Such fiber fines can be selected from any species of hardwood and softwood and/or mixture, or any recycling pulp source. As used herein, the wording "fines" refers to "fiber fines" or "fiber debris" or to a type of fibers that have an average length that is less than 0.1 mm. Fines are very small fibers and fiber fragments such as fibrils which are thread-like elements unraveled from the wall of native cellulose fiber. Fiber fines types, or fines, can refer to small cellulosic materials that are small enough to pass through a forming fabric. A TAPPI Useful Method defines fines as objects small enough to pass through a conical hole having a minimum diameter of 76 micrometers. Fiber fines can have two main origins. So-called "primary fines" that consist of parenchyma cells and other small cells that exist within the wood. Kraft pulping releases them as intact, rod-like objects. By contrast "secondary fines" that are produced by refining. An example of secondary fine tends to be ribbon-like.

The supporting substrate can contain up to 60% of wood fibril, or fibers from wooded resource, with a weighted average fiber length that is less than about 3.0 mm. The supporting substrate can also contain raw base paper formed of fibers that comprises less than 20% of fibers content by dry weight that have a weighted average length between 0.5 and 3.0 mm. In some examples, the supporting substrate can contain up to 60% of wood fibril, or fibers from wooded resource, with a weighted average fiber length that is between 0.3 mm to 2.5 mm. In some other examples, the supporting substrate contains between 10 and 50% of raw base paper that is formed of fibers with a weighted average length between 0.5 and 2.5 mm. The supporting substrate can contain up to 60% of wood fibril, or fibers from wooded resource, with a weighted average fiber length that is less than about 3.0 mm and more than 5% of fiber fines with an average length less than 0.1 mm. The supporting substrate can also contain fibers that comprises less than 20% of fibers content that have an average length between 0.5 and 3.0 mm and have at least 10% of fiber fines with an average length less than 0.1 mm. The weight percentage (wt %) are expressed by total dry weight of the substrate. As used herein, the term "fiber length" can be interpreted broadly as referring to a weighted average fiber length of a pulp after a refining process. Accordingly, if a fiber is "1" mm in length and weighs "w" mg, then for a given pulp, the weighted average length (L) is $\Sigma$ (w1)/$\Sigma$w, or the sum of the products of the weight times the length of each fiber divided by the total weight of the fibers in the specimen.

The fibers can be sourced from natural wood species and can include fibers from recycling pulps (i.e. wood fiber base) (no polymer fiber). The supporting substrate can also be made of any suitable wood or non-wood pulp. Non-limitative examples of suitable pulps include any kind of chemical pulp, mechanical wood pulp, chemically treated ground pulp, CTMP (chemical thermo mechanical pulp), and/or mixtures thereof. In some examples, ground-wood pulp, sulfite pulp, chemically ground pulp, refiner ground pulp, and thermo-mechanical pulp or their mixture can thus be used. In some examples, the raw base contains non-wood pulp such as pulp originating from bamboo, bagasse, kenaf, papyrus, etc. Bleached hardwood chemical pulps may make up the main pulp composition. In some examples, the fibril from wooded source are selected from both natural hardwood and softwood wood or combination of the both species. Pulping process includes wood-free pulping (e.g., kraft chemical pulp and sulfite chemical pulp), or wood pulping (e.g., ground-wood pulp, thermo-mechanical pulp, and/or chemo-thermomechanical pulp), recycled fabric pulp, or combinations thereof.

The supporting substrate can contain a synthetic polymeric fiber as a first constituent material and a natural fiber as a second constituent material. The amount of synthetic polymeric fiber can be within a range of about 5 wt % to about 80 wt %; or can be within a range of about 10 wt % to about 30 wt % by weight of total fibers. The supporting substrate may comprise a PVC-free synthetic polymeric component that is one of synthetic polymeric fiber. In some examples, the synthetic polymeric fiber can be selected from the group consisting of polyolefins, polyamides, polyesters, polyurethanes, polycarbonates, polyacrylics, a combination of two or more of the fibers, and a mixture of two or more of the fibers. The synthetic polyolefin fiber may include, but is not limited to, polyethylene fiber, polyethylene copolymer fiber, polypropylene fiber, polypropylene copolymer fiber, a combination of two or more of the polyolefin fibers, a combination of any of the polyolefin fibers with another polymeric fiber, mixtures of two or more of the polyolefin fibers, or mixtures of any of the polyolefin fibers with another polymer fiber. In some examples, the fiber composition may include a synthetic cellulosic material including, but not limited to, cellulose diacetate, cellulose triacetate, cellulose propionate, cellulose butyrate, cellulose acetate butyrate and nitrocellulose.

The fiber composition can be used to form a web having the non-woven structure, for example, using paper making equipment. The synthetic polymeric fiber may have an average length within a range of about 1 millimeter (mm) to about 3 mm. This length is comparable to the length of natural cellulose fibers. In some other examples, the synthetic polymeric fiber has diameter within a range of about 10 micrometers or microns (m) to about 40 μm with an average length within a range of about 2 mm and about 3 mm.

As indicated above, the fiber composition of the supporting substrate may comprise both synthetic fibers and natural fibers. The natural fiber includes natural cellulose fibers from either hardwood species or hardwood species and softwood species. In some examples, a ratio of hardwood fiber to softwood fiber in the substrate layer can be within a range of about 100:0 to about 20:80. The natural cellulose fiber may be processed into various pulps including, but not limited to, wood-free pulp, such as bleached or unbleached Kraft chemical pulp and bleached or unbleached sulfite chemical pulp; wood-containing pulp, such as one or more of ground wood pulp, thermo-mechanical pulp, and chemo-thermo-mechanical pulp; pulp of non-wood natural fiber, such as one or more of bamboo fiber, bagasse fiber, recycled fiber, cotton fiber; a combination of two or more pulps, or a mixture of two or more of pulps. An amount of synthetic polymeric fiber in the second layer fiber composition that further includes natural fiber may be within a range of about 10 wt % to about 80 wt % by weight of total fiber. In some examples, the amount of synthetic polymeric fiber by weight of total fiber in the fiber composition is about 20 wt % to about 70 wt %, or about 30 wt % to about 60 wt %.

In some examples, the supporting substrate might further comprises internal sizing agent (ASA or AKD). Such internal sizing agent can be emulsified, for examples, using cationic starch at a 1:4 ratio and can be added at a total dosage rate between 0.2 and 2 wt % of the total fiber weight to the fiber furnish. Additionally, other additives such as optical brightener agents and dyes for color adjustments, retention/drainage aids and biocides for operational efficiency can be added into the fiber furnish.

The supporting substrate might further comprise particulate inorganic substances, also called fillers or inorganic pigments. Such inorganic substances are present in the supporting substrate in the form of particles having an average particle size that is between 0.1 and 2.0 μm (micrometer). In some examples, the particulate inorganic substances or fillers are present in an amount comprised between about 0.1 wt % and 40 wt % by total weight of the supporting substrate. In some other examples, the particulate inorganic substances are present in an amount comprised between about 1 wt % and 25 wt % by total weight of the supporting substrate.

Non limited examples of inorganic pigments include: calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo-boehmite, aluminum hydroxide, alumina, lithopone, zeolite, magnesium carbonate, magnesium hydroxide, and various combinations. In some examples, particulate inorganic substances or pigments are selected from the group consisting of silica, clay, kaolin, calcium carbonate, talc, titanium dioxide, and zeolites. In some other examples, pigments are inorganic pigment particles received in a dry-powder form or in a form of an aqueous suspension, often referred as slurry. Examples of suitable particulate inorganic substances include also precipitated calcium carbonate, ground calcium carbonate, talc, clay (e.g., calcined clay, kaolin clay, or other phyllosilicates), calcium sulfate, titanium dioxide ($TiO_2$) or combinations thereof. The particulate inorganic substances can also be calcined clay, ultra-fine precipitated calcium carbonate, modified calcium carbonate, ground calcium carbonate or combinations thereof. In some examples, the particulate inorganic substances, present in the supporting substrate, are combinations of titanium dioxide and ground calcium carbonate. Precipitated calcium carbonate can be commercially available, for example, under the tradenames Opacarb® A40 and Albacar® (both available from Minerals Technologies Inc.). Ground calcium carbonate is commercially available, for example, under the trade names Omyafil®, Hydrocarb® 70 and Omyapaque® (all of which are available from Omya North America). Examples of commercially available filler clays are Kaocal®, EG-44, and B-80 (available from Thiele Kaolin Company). An example of commercially available talc is Finntalc® F03 (available from Mondo Minerals).

The supporting substrate might also further comprise a polymeric substance with high molecular weight (referred to as polymers). The polymeric substances can be natural polymers, i.e. originating from natural resources or can be natural polymers with chemical modification. By "high molecular weight", it is meant a weight average molecular weight ($M_w$) that is greater than $1\times10^4$ grams per mole (g/mol). In some examples, the polymeric substances have a molecular weight that is between about $10^4$ and about $10^7$ g/mol. In some other examples, the polymeric substance is present in an amount representing between 10 and 50 wt % of the total weight the supporting substrate.

The printable medium (100) can comprise a supporting substrate (110) that is a polymeric film substrate (also called herein a base polymeric film). The polymeric film substrate can be a non-porous base substrate that comprises, for examples, polymeric substances with high molecular weight as defined above. The supporting substrate (110) can thus be a polyethylene terephthalate (PET) substrate. The polyethylene terephthalate film can be a filled film, which means thus that some inorganic particles are pre-compounded into the resin matrix before film. In some examples, the polymeric film substrate contains inorganic particles. In some other examples, the polymeric film substrate contains at least two different inorganic particles.

The Image Receiving Layer

The printable recording media comprises a substrate (110) and, at least, an ink receiving layer (120) disposed on one side of the substrate. In some example, the printable media (100) includes an image receiving layer (120) that is coated on the supporting substrate (110), on the image side (101) of the printable media (100). In some other examples, the ink receiving layer (120) is present on both sides of the substrate (110), i.e. on the image side (101) and on the back side (102) of the printable media (100). The image receiving layer can also be called ink receiving layer or inkjet receiving or ink recording layer since, during the printing process, the ink will be directly deposited on its surface. It is believed that the function of the image receiving layer is to provide an optimized media surface so that the ink can be deposited onto it and can generate a good print out with excellent image quality and image durability. In some examples, the image receiving layer (120) can be made of several layer: the image receiving layer can have thus a multi-layer structure. Each layer could have similar or different coating compositions.

The coat weight of the image receiving layer (120) (or the total coat weight if several coating layers are present) may range, for example, from about 0.1 gsm to about 50 gsm or may range from about 1 gsm to about 30 gsm or may range from about 5 gsm to about 20 gsm (gram per square meter). Once coated, the image receiving composition dries to form a layer (i.e., the image receiving layer). In some examples, the thickness of the image receiving layer ranges from about 5 microns (μm) to about 40 microns (μm).

The image receiving layer (120) contains optical density enhancement agents, pigment fillers and polymeric binders. The image receiving layer can also contain optical density enhancement agents, pigment fillers, polymeric binders, a polymeric network and poly-alkene polymeric compounds.

Optical Density Enhancement Agent

The printable media (100) includes an image receiving layer (120) that comprises an "optical density enhancement agent" abbreviated as "ODE agent". It is believed that the ODE agent helps to reduce the "ink pudding effect". The "ink pudding effect" can represent a visual defect resulting in a non-uniform area fill of the printed image. The ink pudding effect could be stronger when the media is a textured media (i.e. with a surface forming "valleys" and "peaks") since the ink will tend to pools predominately in the "valleys" of the texture, leaving the "peaks" mostly uncoated. In other words, it can be said that the presence of optical density enhancement agents, in the image receiving layer, would create a more uniform area fill and a visually more appealing image quality.

The image receiving layer can be made of a single layer or of multiple layer (or sub-layers). The image receiving layer can have thus a composite structure. The optical density enhancement agent (ODE agent) can be inside at least one sub-layer. In some examples, the image receiving layer is a single layer and the ODE agent is comprised in this single layer. In some other examples, the image receiving layer includes multiple sub-layers and the ODE agent is comprised inside the outmost sub-layer. In yet some other examples, the image receiving layer includes multiple sub-layers and the ODE agent is comprised inside the sub-layers next to outmost sub-layer. Further, in yet some other examples, the image receiving layer includes multiple sub-layers and the ODE agent is comprised inside all of the sub-layers. Each sub-layer can have the same chemical composition or different chemical composition.

The image receiving layer might comprise optical density enhancement agents (ODE agents) in an amount representing from about 0.5 to about 20 parts per 100 parts by total dry weight of the coating components present in the image receiving layer. In some other examples, the image receiving layer comprises optical density enhancement agents (ODE agents) in an amount representing from about 2 to about 15 parts per 100 parts by total dry weight of the coating components present in the image receiving layer. In yet some other examples, the image receiving layer comprises optical density enhancement agents (ODE agents) in an amount representing from about 5 to about 10 parts per 100 parts by total dry weight of the coating components present in the image receiving layer.

The optical density enhancement agent (ODE agent) comprises, at least, an ionene compound. The "ionene compound" refers to a polymeric compound having ionic groups as part of the main chain, where ionic groups can exist on the backbone unit, or exist as the appending group to an element of the backbone unit, i.e. the ionic groups are part of the repeat unit of the polymer. In some example, the ionene compound is a cationic charged polymer. The cationic ionene polymer can have a weight average molecular weight of 100 Mw to 8000 Mw. Examples of such cationic charged polymer include: poly-diallyl-dimethyl-ammonium chloride, poly-diallyl-amine, polyethylene imine, poly2-vinylpyridine, poly 4-vinylpyridine poly2-(tert-butylamino) ethyl methacrylate, poly 2-aminoethyl methacrylate hydrochloride, poly 4'-diamino-3,3'-dinitrodiphenyl ether, poly N-(3-aminopropyl)methacrylamide hydrochloride, poly 4,3,3'-diaminodiphenyl sulfone, poly 2-(iso-propylamino)ethylstyrene, poly2-(N,N-diethylamino)ethyl methacrylate, poly 2-(diethylamino)ethylstyrene, and 2-(N,N-dimethylamino) ethyl acrylate.

The ionene compound can be a naturally occurring polymer such as cationic gelatin, cationic dextran, cationic chitosan, cationic cellulose or cationic cyclodextrin. The ionene polymer can also be a synthetically modified naturally occurring polymer such as a modified chitosan, e.g., carboxymethyl chitosan or N, N, N-trimethyl chitosan chloride.

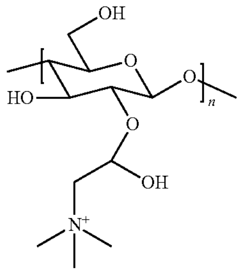

Chitosan

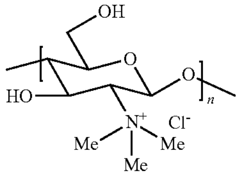

N,N,N-trimethyl chitosan chloride

In some examples, the ionene compound is a polymer having ionic groups as part of the main chain, where ionic groups exist on the backbone unit such as, for example, an alkoxylated quaternary polyamine having the Formula (I)

$$R^1—N^+(A)_2R—[N^+(A)(R)(R^1)]_m—N^+(A)_2R^1;(m+2)\ X^-$$

where R, $R^1$ and A can be the same or different group such as linear or branched $C_2$-$C_{12}$ alkylene, $C_3$-$C_{12}$ hydroxy-alkylene, $C_4$-$C_{12}$ dihydroxy-alkylene or dialkyl-arylene; X can be any suitable counter ion, such as halogen or other similarly charged anions; and m is a numeral suitable to provide a polymer having a weight average molecular weight ranging from 100 Mw to 8000 Mw. In some examples, m is an integer ranging from 5 to 3000. The nitrogen can be quaternized in some examples.

In some other examples, the ionene compound is a polymer having ionic groups as part of the main polymer chain, but exist as the appending group to an element of the backbone unit. The ionic groups are not on the backbone but are part of the repeat unit of the polymer, such as quaternized poly(4-vinyl pyridine) of structure (II) below:

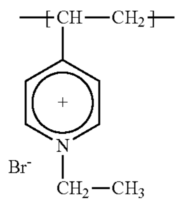

In this example, the above polymer can repeat to provide a polymer with a weight average molecular weight ranging from 100 Mw to 8000 Mw.

The ionene compound can be selected from the groups consisting of polyamines and/or their salts, poly-acrylate diamines, quaternary ammonium salts, poly-oxyethylenated amines, quaternized poly-oxyethylenated amines, poly-dicyandiamide, poly-diallyl-dimethyl ammonium chloride polymeric salt and quaternized dimethyl-aminoethyl(meth) acrylate polymers. In some examples, the image receiving layer comprises an ink optical density enhancement agent that is an ionene compound that can include poly-imines compounds and/or their salts, such as linear polyethyleneimines, branched polyethyleneimines or quaternized poly-ethylene-imine. In some other examples, the ionene compound is a substitute of urea polymer such as poly[bis (2-chloroethyl)ether-alt-1,3 bis[3-(dimethylamino)propyl] urea] or quaternized poly[bis(2 chloro-ethyl)ether-alt-1,3-bis [3-(dimethylamino)propyl]. In yet some other examples, the ionene compound is a vinyl polymer and/or their salts such as quaternized vinyl-imidazol polymers, modified cationic vinyl-alcohol polymers, alkyl-guanidine polymers, and/or their combinations.

In some examples, the printable media of comprises, in the image receiving layer, an ink optical density enhancement agent that is an ionene polymer. The ionene polymer can be a cationic gelatin, cationic dextran, cationic chitosan, cationic cellulose, cationic cyclodextrin, carboxy-methyl chitosan, N,N,N-trimethyl chitosan chloride, alkoxylated quaternary polyamines, polyamines, polyamine salts, polyacrylate diamines, quaternary ammonium salts, polyoxyethylenated amines, quaternized polyoxyethylenated amines, poly-dicyandiamide, poly-diallyl-dimethyl ammonium chloride polymeric salt, quaternized dimethylaminoethyl (meth)acrylate polymers, polyethyleneimines, branched polyethyleneimines, quaternized poly-ethylenimine, polyurias, poly[bis(2-chloroethyl)ether-alt-1,3bis[3-(dimethylamino)propyl]urea], quaternized poly[bis(2-chloroethyl) ether-alt-1,3-bis[3-(dimethylamino)propyl], vinyl polymers or salts thereof, quaternized vinyl-imidazol polymers, modified cationic vinyl alcohol polymers, alkyl-guanidine polymers, or a combination thereof.

Commercially available optical density enhancement agents can be found, for examples, under the tradename BTMS-50, Incroquat® CR or Induquat® ECR from Indulor Chemie GmbH (Germany); Floquat® serials from SFN Inc.; QUAB® serials from SKW QUAB Chemicals Inc.; Tramfloc® serials from Tramfloc Inc.; Zetag® serials from BASF and ZHENGLI® from ZLEOR Chemicals Ltd.

Pigment Fillers

The image receiving layer (120) contains optical density enhancement agents (ODE agents), pigment fillers and polymeric binders. The pigment fillers can be either inorganic and/or organic particulates, either in solids powder form or in a dispersed slurry form. In some examples, the image receiving layer (120) contains inorganic pigment fillers. Examples of inorganic pigment filler include, but are not limited to, aluminum silicate, kaolin clay, a calcium carbonate, silica, alumina, boehmite, mica, talc, and combinations or mixtures thereof. The inorganic pigment filler can include clay or a clay mixture. The inorganic pigment filler can include a calcium carbonate or a calcium carbonate mixture. The calcium carbonate may be one or more of ground calcium carbonate (GCC), precipitated calcium carbonate (PCC), modified GCC, and modified PCC. The pigment fillers may also include a mixture of a calcium carbonate and clay. In some examples, the inorganic pigment fillers include two different calcium carbonates pigments (e.g., GCC and PCC). Examples of organic pigment filler include, but are not limited to, particles, either existing in a dispersed slurry or in a solid powder, of polystyrene and its copolymers, polymethyacrylates and their copolymers, polyacrylates and their copolymers, polyolefins and their copolymers, such as polyethylene and polypropylene, a combination of two or more of the polymers. Examples of inorganic pigments include but not limited to, calcium carbonate, zeolite, silica, talc, alumina, aluminum trihydrate (ATH), calcium silicate, kaolin, calcined clay, and combination or mixtures of any of these. Examples of inorganic compound, also includes, but are not limited to, ground calcium carbonate such as Hydrocarb® 60 available from Omya, Inc.; precipitated calcium carbonate such as Opacarb® A40 or Opacarb® 3000 available from Specialty Minerals Inc. (SMI); clay such as Miragloss® available from Engelhard Corporation; synthetic clay such as hydrous sodium lithium magnesium silicate, such as, for example, Laponite® available from Southern Clay Products Inc., and titanium dioxide ($TiO_2$) available from, for example, Sigma-Aldrich Co. Examples of inorganic pigments include, but are not limited to, compound, either existing in a dispersed slurry or in a solid powder, of polystyrene and its copolymers, polymethyacrylates and their copolymers, polyacrylates and their copolymers, polyolefins and their copolymers, such as polyethylene and polypropylene, a combination of two or more of the polymers. The inorganic compound may be chosen from silica gel (e.g., Silojet® 703C available from Grace Co.), modified (e.g., surface modified, chemically modified, etc.) calcium carbonate (e.g., Omyajet® B6606, C3301, and 5010, all of which are available from Omya, Inc.), precipitated calcium carbonate (e.g., Jetcoat® 30 available from Specialty Minerals, Inc.), and combinations thereof.

In some examples, the pigment fillers have an average particle size in the range of about 0.05 to about 25 micrometers (μm, 10-6m). In some other examples, the pigment fillers have an average particle size in the range of about 0.1 to about 10 micrometers (μm). The amount of pigment fillers, in the image receiving layer, can be within the range of about 0.5 to about 30 wt % or within the range of about 1 to about 20 wt % or within the range of about 1 to about 15 wt % by total weight of the image receiving layer.

Polymeric Binder

The image receiving layer (120) contains optical density enhancement agents (ODE agents), pigment fillers and polymeric binders. The image receiving layer include a polymeric binder that is a non-reactive polymeric substance. The term "non-reactive" refers herein to the fact that these polymeric substances are substantially not reactive with other compounds present in the polymer network described below. The word "substantially" means that the tendency, or reaction speed, of the reaction between the polymeric networks with the non-reactive polymeric substance is minimal comparing with self-cross-linking and inter cross-linking of the polymeric network.

The non-reactive polymer substance or binder, present in the image receiving layer (120), can be a water soluble or water dispersible in a form of emulsion. In some example, the non-reactive polymer substances are aqueous based polymeric mixture. The term "aqueous polymeric mixture" is meant herein to include any hydrophilic or hydrophilic/hydrophobic blend of polymer material that soluble and/or dispersible to aqueous solvent to form a coating in accordance with examples of the present disclosure. The non-reactive polymeric substance can include ingredients which can form a non-continuous film, or distributed compound inside of the polymer network. The non-reactive polymeric substance can include ingredients which can be a blend of film-forming polymers and of non-film-forming polymers.

The binder, or non-reactive polymeric substance, can be present, in the image receiving layer, in an amount representing more than 2 parts by total parts, by dry weight, of the image receiving layer. The amount of the binder, that is present in the image receiving layer (120), can represent from about 2 to about 40 parts per 100 parts of pigment filler by dry weight; or can represent from about 5 to about 30 parts per 100 parts of pigment filler by dry weight.

The binder, or non-reactive polymeric substance, can be either a synthetic or a natural substances or an aqueous dispersible substance like polymeric latex. In some examples, the non-reactive polymeric substance is polymeric latex. The binder or non-reactive polymeric substance can be a water soluble polymer or water dispersible polymeric latex or mixture. In some examples, the binder have a glass transition temperature (Tg) ranging from −40° C. to +85° C. The way of measuring the glass transition temperature (Tg) parameter is described in, for example, Polymer Handbook, 3rd Edition, authored by J. Brandrup, edited by E. H. Immergut, Wiley-Interscience, 1989.

Suitable binder include, but are not limited to, water soluble polymers such as polyvinyl alcohol, starch derivatives, gelatin, cellulose derivatives, acrylamide polymers, and water dispersible polymers such as acrylic polymers or copolymers, vinyl acetate latex, polyesters, vinylidene chloride latex, styrene-butadiene or acrylonitrile-butadiene copolymers. Non-limitative examples of suitable binders include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof. In some examples, the binder is a polymer and copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers.

In some other examples, the binder component is a latex containing compound of a vinyl acetate-based polymer, an acrylic polymer, a styrene polymer, an SBR-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. Examples of binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. Examples of binders include Poval® 235, Mowiol® 56-88, Mowiol® 40-88 (products of Kuraray and Clariant).

The binder (or non-reactive polymeric substance) may have an average molecular weight (Mw) of about 5,000 to about 500,000. In some examples, the binder has an average molecular weight (Mw) ranging from about 100,000 to about 300,000. In some other examples, the binder has an average molecular weight of about 250,000. The average particle diameter of the latex binder can be from about 10 nm to about 10 μm; in some other examples, from about 100 nm to about 5 μm; and, in yet other examples, from about 500 nm to about 0.5 μm. The particle size distribution of the binder is not particularly limited, and either binder having a broad particle size distribution or binder having a mono-dispersed particle size distribution may be used. The binder may include, but is in no way limited to latex resins sold under the name Hycar® or Vycar® (from Lubrizol Advanced Materials Inc.); Rhoplex® (from Rohm & Hass company); Neocar® (from Dow Chemical Comp); Aquacer® (from BYC Inc) or Lucidene® (from Rohm & Haas company). Other examples of suitable polymeric binders include aqueous based binders such as polyvinyl alcohol (examples of which include Kuraray Poval® 235, Mowiol® 40-88, and Mowiol® 20-98 available from Kuraray America, Inc.), styrene-butadiene emulsions, acrylonitrile-butadiene latex, and combinations thereof.

In some examples, the binder is selected from natural macromolecule materials such as starches, chemical or biological modified starches and gelatins. The binder (or non-reactive polymeric substance) could be a starch additive. The starch additive may be of any type, including but not limited to oxidized, ethylated, cationic and pearl starch. In some examples, the starch is used in an aqueous solution. Suitable starches that can be used herein are modified starches such as starch acetates, starch esters, starch ethers, starch phosphates, starch xanthates, anionic starches, cationic starches and the like which can be derived by reacting the starch with a suitable chemical or enzymatic reagent. In some examples, the starch additives can be native starch, or modified starches (enzymatically modified starch or chemically modified starch). In some other examples, the starches are cationic starches and chemically modified starches. In yet some other examples, the starch is used in a form of nano-sized dispersed slurry. Useful starches may be prepared by known techniques or obtained from commercial sources. Examples of suitable starches include Penford Gum-280 (commercially available from Penford Products), SLS-280 (commercially available from St. Lawrence Starch), the cationic starch CatoSize 270 (from National Starch) and the hydroxypropyl No. 02382 (from Poly Sciences). In some examples, a suitable size press/surface starch additive is 2-hydroxyethyl starch ether, which is commercially available under the tradename Penford® Gum 270 (available from Penford Products). In some other examples, a suitable starch is nano sized bio-starch, which is commercially available under the tradename Ecosphere 2202®. The water-soluble polymer binder can be available under the tradename PrintRite® DP376, DP350, DP351, DP675, DP261, DP218E, Hycar® 26172 (all available from Lubrizol).

Polymeric Network

In some examples, the image receiving layer further comprises a polymeric network. In some other examples, the image receiving layer further comprises a polymeric network and poly-alkene polymeric compounds. The wording "polymer network" refers herein to a polymer and/or a polymer mixture which can be self-cross-linked, by reaction of different function groups in the same molecular chain, or inter-cross-linked by reaction with another compound which has different function group. In some examples, the polymeric network can be formed by using self-cross linked polyurethane polymers or cross-linkable polyglycidyl or polyoxirane resins. The polymeric network can be formed by using self-cross linked polyurethane polymers. The self-cross linked polyurethane polymer is formed by reacting an isocyanate with a polyol, where both isocyanates and polyols have average less than three end functional groups per molecule so that the polymeric network is based on a liner polymeric chain structure. The polyurethane chain can have a trimethyloxysiloxane group and cross-link action can take place by hydrolysis of the function group to form silsesquioxane structure. The polyurethane chain can also have an acrylic function group, and the cross-link structure can be formed by nucleophilic addition to acrylate group through acetoacetoxy functionality. In some other examples, the polymeric network is formed by using vinyl-urethane hybrid copolymers or acrylic-urethane hybrid polymers. In yet some other examples, the polymeric network includes an aliphatic polyurethane-acrylic hybrid polymer. Representative commercially available examples of the chemicals which can form a polymeric network include, but are not limited to, NeoPac® R-9000, R-9699 and R-9030 (from Zeneca Resins), Sancure® AU4010 (from Lubrizol) and Hybridur® 570 (from Air Products).

The polymeric network can include a polymeric core that is, at least, one polyurethane. The polyurethanes include aliphatic as well as aromatic polyurethanes. The polyurethane is the reaction products of the following components: a polyisocyanate having at least two isocyanate (—NCO) functionalities per molecule with, at least, one isocyanate reactive group such as a polyol having at least two hydroxy groups or an amine. Suitable polyisocyanates include diisocyanate monomers, and oligomers. Examples of polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. In some other, the polyurethanes are aromatic polyether polyurethanes, aliphatic polyether polyurethanes, aromatic polyester polyurethanes, and aliphatic polyester polyurethanes. Representative commercially available examples of polyurethanes include Sancure® 2710 and/or Avalure® UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878, Sancure 815, Sancure® 1301, Sancure® 2715, Sancure® 2026, Sancure® 1818, Sancure® 853, Sancure® 830, Sancure 825, Sancure 776, Sancure 850, Sancure 12140, Sancure 12619, Sancure 835, Sancure® 843, Sancure® 898, Sancure® 899, Sancure® 1511, Sancure® 1514, Sancure® 1517°, Sancure® 1591, Sancure® 2255, Sancure® 2260, Sancure® 2310, Sancure® 2725, and Sancure® 12471 (all commercially available from Lubrizol Inc.).

In some example, the polymeric network, is created by using cross-linkable polyglycidyl or polyoxirane resins. Cross-link reaction can take place either with themselves (through catalytic homopolymerisation of oxirane function group) or with the help of a wide range of co-reactants including polyfunctional amines, acids, acid anhydrides, phenols, alcohols, and thiols. Both polyglycidyl resin and co-reactants are compatible with the chemicals which form a polymeric network before curing in liquid state. The term "compatible" refers here to the fact that there is no significant phase separation after mixing in the room temperature.

In some examples, the polymeric network comprises epoxy-functional additives. Epoxy-functional additives can include alkyl and aromatic epoxy resins or epoxy-functional resins, such as for example, epoxy novolac resin(s) and other epoxy resin derivatives. Epoxy-functional molecules can include at least one, or two or more pendant epoxy moieties. The molecules can be aliphatic or aromatic, linear, branched, cyclic or acyclic. If cyclic structures are present, they may be linked to other cyclic structures by single bonds, linking moieties, bridge structures, pyro moieties, and the like. Examples of suitable epoxy functional resins are commercially available and include, without limitation, Ancarez® AR555 (commercially available from Air Products), Ancarez® AR550, Epi-rez 3510W60, Epi-rez 3515W6, or Epi-rez® 3522W60 (commercially available from Hexion).

In some other examples, the polymeric network includes epoxy resins. Examples of suitable aqueous dispersions of epoxy resins include Waterpoxy® 1422 (commercially available from Cognis) or Araldite® PZ 3901, Araldite® PZ 3921, Araldite® PZ 323 and Araldite® PZ 3961 (commercially available from Huntsman). The polymeric network can comprise crosslink agents. The examples of crosslink agents that can be used herein include liquid aliphatic or cycloaliphatic amine crosslink agents of various molecular weights, in 100% solids or in emulsion or water and solvent solution forms. Amine adducts with alcohols and phenols or emulsifiers can also be envisioned. Examples of suitable commercially available hardeners include Aradur® 39, Aradur® 340; Aradur® 3805; Aradur® 3984; Aradur® 3985 and Aradur® 3986 (from Huntsman) and EPI-CURE® 8290-Y-60 (from Hexion). In some examples, the crosslink agents are aqueous acids, acid anhydrides, phenols, alcohols and/or thiols.

In some examples, the image receiving layer includes a polymeric network that is a hybrid network created by using self-cross linked polyurethane polymers and by using cross-linkable polyglycidyl or polyoxirane resins. In some other examples, the image receiving layer comprises a polymeric network that is created by using vinyl-urethane hybrid copolymers or acrylic-urethane hybrid polymers and water-based epoxy resins and water-based polyamines.

Poly-Alkene Polymeric Compounds

In some other examples, the image receiving layer further includes poly-alkene polymeric compounds. Such polymeric compounds can be considered as organic beads. By "poly-alkene compound", it is meant herein that the polymeric compound is made, for instance, from a poly-alkene homopolymer, a poly-alkene copolymer, a modified poly-alkene, a combination of two or more of the above-listed poly-alkenes, or a mixture of two or more thereof. By definition, a "poly-alkene" refers to a polymeric material formed via polymerization of an alkene monomer, i.e., $C_nH_{2n}$ and its derivatives, where n is within a range of about 7,000 to about 20,000. Examples of the polymers used to make the poly-alkene polymeric compounds include, but are not limited to, polyethylene homopolymer, polypropylene homopolymer, polytetrafluoroethylene (PTFE), polyamide, amide-modified polyethylene, amide-modified polypropylene, PTFE-modified polyethylene, PTFE-modified polypropylene, maleic anhydride-modified polyethylene, maleic anhydride-modified polypropylene, oxidized polyethylene, oxidized polypropylene, chloride polyethylene, chloride polypropylene, a combination of two or more of the above-listed poly-alkenes, or a mixture of two or more of the above-listed poly-alkenes.

The polymeric compounds can have a hardness value less than about 2 dmm, as measured by ASTM D-5 method. In some other examples, the compounds have a hardness value less than about 1, or less than about 0.5 dmm. In some examples, the size of the polymeric particles can be in the range of about 2 to about 40 μm. The poly-alkene polymeric compounds can have a hardness value, in dmm, which is within a range of about 0.1 to about 2, or about 0.1 to about 1.5. In some examples, the poly-alkene polymeric compounds are polytetrafluoroethylene (PTFE), polyamide or polyethylene polymer compounds. In some other examples, the poly-alkene polymeric compounds are polytetrafluoroethylene (PTFE), polyamide or polyethylene polymer compounds and have an average particle size be in the range of about 10 to about 60 μm. In yet some other examples, the polymeric compounds are polyamide polymers. The poly-alkene polymeric compounds can thus be polyamide particles that have a Vicat softening point ranging from about 100° C. to about 180° C., as measured by the Industrial standard ASTM D1525, and have a melting point ranging from about 100° C. to about 220° C., as measured by the industrial standard ISO3146.

The poly-alkene polymeric compounds can be present, in image receiving layer, in an amount representing from about 0.2 to about 30 dry parts, or from about 1 to about 20 dry parts, by total dry parts of the image receiving layer.

Representative commercially available examples of poly-alkene polymeric compounds include, but are not limited to; Acumist® micronized polyolefin waxes by Honeywell; Slip-ayd® waxes by Elementis Specialties, and Licowax® waxes by Clariant, Germany. In some examples, the poly-alkene polymeric compounds are made from a micronized polyalkene compound dispersed in an aqueous solvent. The poly-alkene polymeric compounds can be available under the tradename Organsol® 2002ES3NAT3 (available from Arkema) or under the tradename Slip-ayd® SL300 (available from Elementis Specialties).

Other Components or Additives

In addition to the above-described components, the image receiving layer might contain other components or additives. The additives include, but are not limited to, one or more of rheology modifiers, thickening agents, surfactants, defoamers, optical brighteners, dyes, pH controlling agents or wetting agents, and dispersing agents, for example. The total amount of additives, in the image receiving layer, can be from about 0.1 wt % to about 10 wt % or from about 0.2 wt % to about 5 wt %, by total dry weight of the image receiving layer.

In some examples, the image receiving layer might contain surfactants. In some other examples, the image receiving layer might contain nonionic surfactants. Several commercially available nonionic surfactants that can be used include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), and Dynol® series (e.g. Dynol® 607 and Dynol® 604) manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; Alkoxylated surfactant such as Tego® Wet 510 manufactured from Evonik; fluorinated PolyFox® nonionic surfactants (e.g., PF159 nonionic surfactants), manufactured by Omnova; or combinations thereof. Suitable cationic surfactants that may be used include long chain amines and/or their salts, acrylated diamines, polyamines and/or their salts, quaternary ammonium salts, poly-oxyethylenated long-chain amines, quaternized polyoxyethylenated long-chain amines, and/or combinations thereof. The surfactant, if present, can be included in the image receiving layer at from about 0.05 wt % to about 1.5 wt %. In one example, the surfactant can be present in an amount ranging from about 0.1 wt % to about 1 wt %.

The image receiving layer composition can be prepared in a liquid carrier that is used to disperse or solubilize composition components. The liquid carrier can be removed, at least in part, from the final product (media) once the composition is applied to the substrate, or can include compounds that remain as solids when a portion of the carrier is removed, through drying. The liquid carrier can include one or more of water, co-solvents, surfactants, viscosity modifying agents, inorganic compounds, pH control agents, deformers, or the like. The primary function of the carrier is to dissolve and/or carry the solids or other components that are to remain on the media as a coating, and for example, provide a carrier that will suitably carry all the components in the composition and help them uniformly distribute on the media surface. There is no specific limitation on selection of the carrier components, as long as the carrier as a whole has the function described above. In some examples, the image receiving layer composition comprises a liquid carrier that includes water.

The Barrier Layer

The printable media may further comprise a barrier layer (130). Said barrier layer might be deposited over the supporting substrate (110), on the non-imaging side of the media (102). The barrier layers can be resin-rich pigment coating layers. It is believed that the function of this layer is to act as a "barrier" and, for example, to reduce the penetration of exterior moisture into the substrate. The barrier layer includes one or more types of pigment particles and polymer resin binder. The term "resin-rich" refers to compositions in which larger proportions of polymer resin components are included than are needed to bind the pigment particles to each other and the barrier layer to the underlying substrate, which can be in the range of 5-20% by weight of total coating amount.

For example, a resin-rich barrier layer may include polymer resins in amounts that are at least 30% by weight of the total pigment fillers. In one example, the barrier layer includes 60 to 80% resins by total weight of barrier layer. A wide variety of resin compositions which can be used in the barrier layer. For example, the resin compositions may include, but are not limited to, resins formed by polymerization of hydrophobic addition monomers. Examples of hydrophobic addition monomers include, but are not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylica containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido)methylene), and combinations thereof. In particular, polymers made from the polymerization and/or copolymerization of alkyl acrylate, alkyl methacrylate, vinyl esters, and styrene derivatives may be useful. The polymers can be made using a wide variety of polymerization methods. For example, the polymers may be made using bulk polymerization, solution polymerization, emulsion polymerization, or other suitable methods. In one implementation, the emulsion polymerization in the presence of aqueous solvent such as water may be useful in making the polymer resins described above. In one example, the polymer latex resin was made using emulsion polymerization with a particle size ranging from 0.1 to 5 micrometers. The range of particles sizes can be narrower in some implementations. For example, the particle size may range from 0.5 to 3 micrometers. The glass transition temperature, Tg, of polymer resin can be another factor that influences the desired performance. The glass transition temperature of the polymer resin can be in the range of from about 20 to about 50° C.

Inorganic pigments can also be present in barrier coating layer composition. In one implementation, the inorganic pigments in the barrier coating layers can have a mean size from 0.2 micrometers to 1.5 micrometers These inorganic pigments can be in a powder or slurry form, and examples include, but are not limited to, titanium dioxide, hydrated alumina, calcium carbonate, barium sulfate, silica, clays (such as high brightness kaolin clays), and zinc oxide. In some examples, the inorganic pigment is calcium carbonate.

Method for Forming a Printable Media

In some examples, according to the principles described herein, a method for forming a printable media is provided herein. The method encompasses: providing a supporting substrate, with an image side and a non-image side, including fibers; providing an image receiving layer composition by adding ink optical density enhancement agents into a mixture of pigment fillers and polymeric binders; coating the image receiving layer composition on the image side of the supporting substrate; and drying the coating layer under heat to form a printable media. In some other examples, the supporting substrate and the image receiving layer are embossed in order to obtain textured surfaces on the image side of the printable media. In yet some other examples, a barrier layer could be deposited over the supporting substrate, on the non-imaging side, of the media either by coating or lamination techniques.

FIG. 5 is a flowchart illustrating an example of a method (300) of making the printable media (100) such as described herein. Such method (300) encompasses: providing (310) a supporting substrate including fibers with an image side and a non-image side; providing (320) an image receiving layer composition by adding ink optical density enhancement agents into a mixture of pigment fillers and polymeric binders; coating (330) an image receiving layer composition (120) onto the image side of the supporting substrate (110) and drying (340) the coating layer under heat to form a printable media.

The method (300) for forming the printable media comprises coating (330) an image receiving layer (120) on the image side (101) of the base substrate (110), using a coater or any applicators. The image receiving layer may be coated using applicator including, but not limited to, one or more a spray coater, a spin coater, a slot die applicator, fountain curtain applicator, blade applicator, rod applicator, air knife applicator, or air brush applicator. The image receiving layer (120) is dried using one or more a blower, a fan, an infrared lamp, and an oven.

In some examples, the printable media is a textured printable media meaning thus that the supporting substrate and the image receiving layer have been embossed in order to obtain textured surfaces on the image side of the printable media. An embossing process can be used to achieve the desired textured aspect and surface roughness. Such process includes, at least, two rollers: an embossing and a backing roller. The embossing roller contains the desired texture. In some examples, in order to develop the desired texture, a computer generated image is formed and processed with special software to form digitalized image receiving layers. The images are then engraved layer by layers to the steel embossing roller with a laser beam controlled by computer. The backing roller can be made in rubber material or paper/woolen. Two or more backing rollers can be used to form two or more nips. The nip pressure between embossing roller and backing roller is controlled by hydraulic system.

Printing Method

The printable media (100) as described herein can be used in a printing method. The printing method encompasses obtaining a printable media comprising a supporting substrate, with an image side and a non-image side, including fibers and an image receiving layer coated on the image side of the supporting substrate comprising pigment fillers, polymeric binders and ink optical density enhancement agents; and, then, applying an ink composition onto said printable media to form a printed image.

The printable media (100) may be used as a wall covering material (e.g., wallpaper) for home or commercial use, for decoration or display. The printable media can thus be a printable wall covering media. The printable media is specifically designed to receive any inkjet printable ink, such as, for example, organic solvent-based inkjet inks or aqueous-based inkjet inks. The ink composition forms an image on the image side of the printable media or on the image side of wall covering media. In some examples, the printable media is well adapted to be used with latex-based ink composition, i.e. an ink composition containing latex components.

The ink composition may be deposited, established, or printed on the printable media using any suitable printing device. In some examples, the ink composition is applied to the printable media via inkjet printing techniques. The ink may be deposited, established, or printed on the media via continuous inkjet printing or via drop-on-demand inkjet printing, which includes thermal inkjet printing and piezoelectric inkjet printing. Representative examples of printers used to print on the printable media or wall covering media, as defined herein, include, but are not limited to, HP DesignJet printers: L25500, L26500, and L65500; HP Scitex printers: LX600, LX800, LX850, and TurboJet 8600 UV from Hewlett-Packard Company. Representative inkjet inks used by the above-listed printers include, but are not limited to, HP 791, HP 792, and HP Scitex TJ210. The printers may be used in a standard wall paper profile with a production print mode or a normal print mode. The print mode may vary the ink application within a range of from about 50% to about 250% of each other.

Some examples of inkjet inks that may be deposited, established, or otherwise printed on the printable media include pigment-based inkjet inks, dye-based inkjet inks, pigmented latex-based inkjet inks, and UV curable inkjet inks. Additionally, the printable media are also designed to receive thereon a solid toner or a liquid toner. The solid toner or the liquid toner may include toner particles made, e.g., from a polymeric carrier and one or more pigments. The liquid toner may be an organic solvent-based (e.g., hydrocarbon) liquid toner. The solid toner or the liquid toner may be deposited, established, or otherwise printed on the examples of the printable media using, respectively, a suitable dry or liquid press technology, such as a dry toner electrophotographic printing device or a liquid toner electrophotographic printing device.

In some examples, the ink composition is an inkjet ink composition and contains one or more colorants that impart the desired color to the printed message. As used herein, "colorant" includes dyes, pigments, and/or other particulates that may be suspended or dissolved in an ink vehicle. The colorant can be present in the ink composition in an amount required to produce the desired contrast and readability. In some other examples, the ink compositions include pigments as colorants. Pigments that can be used include self-dispersed pigments and non-self-dispersed pigments. Pigments can be organic or inorganic particles as well known in the art. As used herein, "liquid vehicle" is defined to include any liquid composition that is used to carry colorants, including pigments, to a substrate.

In some other examples, the ink composition that is applied to the printable media is an ink composition containing latex components. Latex components are, for examples, polymeric latex particulates. The ink composition can contain polymeric latex particulates in an amount representing from about 0.5 wt % to about 15 wt % based on the total weight of the ink composition. The polymeric latex refers herein to a stable dispersion of polymeric microparticles dispersed in the aqueous vehicle of the ink. The polymeric latex can be natural latex or synthetic latex. Synthetic latexes can be produced by emulsion polymerization using a variety of initiators, surfactants and monomers. In various examples, the polymeric latex can be cationic, anionic, or amphoteric polymeric latex. In some examples, the latexes are prepared by latex emulsion polymerization and have a weight average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

Ingredients

The raw materials and chemical components used in the illustrating samples are listed in Table 1.

TABLE 1

| Ingredient name | Nature of the ingredient | supplier |
|---|---|---|
| Hydrocarb ® 60 | Calcium carbonate pigment fillers | Omya NA |
| Araldite ® PZ 3921 | polymeric network | Huntsman |
| Aradur ® 3985 | polymeric network | Huntsman |
| Slip-ayd ® SL 177 | poly-alkene polymeric compound | Elementis Specialties |
| PrintRite ® DP 376 | Polymeric binder | Lubrizol |
| Tegowet ® 510 | Surfactant | Evonik |
| Tergitol ® 15 S-7 | Surfactant | Evonik |
| Floquat ® FL-3150 | ODE agent | SFN Inc |
| SD 690 | Alumina pigment filler | SaiDe Co. |

Preparation of Printable Media Samples

A support substrate is fabricated using 100 parts of a fiber mixture that includes about 22 parts of softwood bleached kraft pulp, about 60 parts of hardwood bleached kraft pulp, about 5 parts of polymeric fiber pulp and about 13 parts of recycled fibers in a machine broke, in water. Both softwood and hardwood kraft pulps and polymeric fibers are refined separately using a double disc refiner and are mixed with other fibers in the ratio mentioned above. About 20% to about 25% fines having an average length of less than 0.1 mm are included in the substrate. A mixture of inorganic particles are added into the fiber furnish to achieve about 13% target ash content (measured inline) (13 wt % of inorganic particles with a particles sizes of about 0.3 to about 0.5 μm). The inorganic particles include grounded calcium carbonate powder and $TiO_2$ powder in a weight ratio of 10 parts to 1.5 parts. Such particles are added in order to enhance opacity, brightness and whiteness. The supporting substrate has a basis weight of 165 gsm. The substrate is made using a commercial Fourdrinier paper machine.

After the composite web is dried, the web is brought to surface size station with a puddle or rod metering size press machine. A surface size solution comprising polymeric latex (an anionic polyacrylic latex) is applied on the surface of substrate web and dried.

Several image receiving composite compositions are prepared in a high shear mixer. The final solids content after mixing is about 21% and the viscosity is about 180 centipoise (cps) as measured by a Brookfield viscometer at 100 rpm. Each image receiving layer is applied to the obtained supporting substrate samples at a coat weight of about 5 to about 8 gsm in order to obtain the media samples A to F. A production coater equipped with Mayer rod application station is used to coat the coating layers. Drying is accomplished in an 8 meter hot air drying channel with a total coating speed of 30 meters per minute. The compositions of the image receiving layers are illustrated in the Table 2 below. Composition (A) is a comparative example, Compositions (B) to (F) are examples according to the present disclosure. Each number expresses the dry amount (in Parts).

TABLE 2

| Image receiving composition (in Parts per dry weight) | | | | | | |
|---|---|---|---|---|---|---|
| Chemical ingredients | Exp. A (comp) | Exp. B | Exp. C | Exp. D | Exp. E | Exp. F |
| PrintRite ® DP 376 | 11 | 11 | 11 | 11 | 11 | 11 |
| Araldite ® PZ 3901 | 8 | 8 | 8 | 8 | 8 | 8 |
| Aradur ® 3985 | 8 | 8 | 8 | 8 | 8 | 8 |
| Slip ady ® SL 177 | 5 | 5 | 5 | 5 | 5 | 5 |
| SD690 | 0.8 | 0.8 | 0.8 | 0.8 | 0.8 | 0.8 |
| Hydrocarb ® H60 | 10 | 10 | 10 | 10 | 10 | 10 |
| Tergitol ® 15 S-7 | 1 | 1 | 1 | 1 | 1 | 1 |
| Tegowet ® 510 | 1.6 | 1.6 | 1.6 | 1.6 | 1.6 | 1.6 |
| Floquat ® FL-3150 | 0 | 2 | 4 | 6 | 8 | 10 |

After coating the image receiving layers, the obtained printable media can be embossed with an embossing machine in order to obtain the textured media samples A2 to F2. Such embossing machine includes at least two rollers: an embossing roller which is laser engraved with a specific pattern that is designed by a graphic designer, and at least a backing roller either with rubber cover or paper/wool type backing. The media is going through the nip between the embossing roller and the backing roller. The nip is often pressurized with a hydraulic system. After embossing, the media surface will mimic the design pattern of the embossing roller.

Printable Media Performances

The media samples A to F are printed using an HP DesignJet L260 printer (a 60 inch wide, large format, latex inkjet printer) using a six color process system (cyan, magenta, yellow, black, light cyan, and light magenta aqueous-latex type of ink). The print mode is 16-pass bidirectional in native color mode (no color rendering), and heater is set at points of 50 degree Celsius for drying, and 110 degree Celsius for curing. An image is created on each media samples A to F. The printed media are then evaluated for abrasion performances and image quality. The results of these tests are illustrated in Table 3 and 4 below. The printed media is printed and analyzed on its un-embossed form (i.e. the media will thus have a smooth surface, printed media samples A1 to F1) and on its embossed form (i.e. the media will thus have a textured surface, printed media samples A2 to F2).

The Durability test (Scrub test), in accordance with ASTM F793, is performed by exposing the various Samples to be tested, to a nylon bristle brush and detergent solution (made in accordance with "Note 1" under section 7.4.1 of ASTM F793) in a BYK Abrasion Tester (from BYK-Gardner USA, Columbus, Md.) with a linear, back-and-forth action, attempting to wear down the image side of the Samples (300 cycles of a nylon brush over a printed surface, wet with trisodium-phosphate based cleaning solution). After the test is concluded, the Samples are rated "pass" or "fail" according to the guidelines listed in 7.7.2 and the visual rating criteria listed in 7.4.2 of ASTM F793. Any "visual difference" in the printed surface fails the test (score equal or below 3). If there is no difference, then the sample passes (score 4-5).

Image quality (IQ) is evaluated both numerically by QEA equipment, and by a visual inspection calibrated with scale 1-5 (with 1 being worst and 5 best). The bigger the visual IQ score is, the better the image quality is. The QEA equipment analyzes non-uniformities in a given area which follows ISO 36660 calculations and outputs a numerical value for image noise. QEA-R, QEA-B and QEA-G refers to overall image quality of secondary colors (red, green, and blue). The QEA equipment is a PIAS-II® equipment, an A High-Performance Portable Tool for Print Quality Analysis, manufactured by Quality Engineering Associates (QEA), Inc. The higher the QEA value is, the worse the defect is and the Smaller the QEA value is, the better the image quality is.

TABLE 3

| "Un-embossed" Media Sample | Visual IQ | Scrub |
|---|---|---|
| A1 | 4 | 4.5 |
| B1 | 5-good | 4.5 |
| C1 | 5-good | 4 |
| D1 | 5-good | 4 |
| E1 | 5-good | 4 |
| F1 | 5-good | 3 |

TABLE 4

| "Textured" Media Sample | Visual IQ | QEA-R | QEA-B | QEA-G | Scrub |
|---|---|---|---|---|---|
| A2 | 2 | 6.5 | 6.5 | 7.5 | 4 |
| B2 | 3 | 5.3 | 6.7 | 5.5 | 4 |
| C2 | 3.5 | 2.9 | 5 | 3.8 | 4 |
| D2 | 5 | 1.6 | 1.4 | 1.8 | 4 |
| E2 | 5 | 1.7 | 1.5 | 1.9 | 4 |
| F2 | 5 | 1.7 | 1.5 | 1.8 | 4 |

According to the obtained results, it can be seen that, for smooth surface media (i.e. "un-embossed" media, samples A1 to F1), the ODE agent helps to improve the total image quality. In addition, it can be seen that, for textured surface media (i.e. "embossed" media, samples A2 to F2), the ODE agent helps to improve the total image quality (promotes better color gamut but also eliminate the ink pudding) while having no negative impact on image durability.

The invention claimed is:

1. A printable media comprising:

a. a supporting substrate, with an image side and a non-image side, including fibers;

b. and, at least, an image receiving layer coated on the image side of the supporting substrate comprising pigment fillers, polymeric binders and ink optical density enhancement agents, wherein the image receiving layer comprises a polymeric network and poly-alkene polymeric compounds.

2. The printable media of claim 1 wherein the supporting substrate contains a synthetic polymeric fiber as a first constituent material and a natural fiber as a second constituent material.

3. The printable media of claim 1 wherein the supporting substrate comprises particulate inorganic substances.

4. The printable media of claim 1 wherein the supporting substrate is a polymeric film substrate.

5. The printable media of claim 1 wherein, in the image receiving layer, the ink optical density enhancement agent comprises, at least, an ionene compound.

6. The printable media of claim 5 wherein the ionene compound is a cationic charged polymer.

7. The printable media of claim 5 wherein the ionene compound is a cationic gelatin, cationic dextran, cationic chitosan, cationic cellulose, cationic cyclodextrin, carboxymethyl chitosan, N, N, N -trimethyl chitosan chloride, alkoxylated quaternary polyamines, polyamines, polyamine salts, polyacrylate diamines, quaternary ammonium salts, polyoxyethylenated amines, quaternized polyoxyethylenated amines, poly-dicyandiamide, poly-diallyl-dimethyl ammonium chloride polymeric salt, quaternized dimethylaminoethyl(meth)acrylate polymers, polyethyleneimines, branched polyethyleneimines, quaternized poly-ethylenimine, polyurias, poly[bis(2-chloroethyl)ether-alt-1,3bis[3-(dimethylamino)propyl]urea], quaternized poly[bis(2-chloroethyl)ether-alt-1,3-bis[3-(dimethylamino)propyl], vinyl polymers or salts thereof, quaternized vinyl-imidazol polymers, modified cationic vinyl alcohol polymers, alkyl-guanidine polymers, or a combination thereof.

8. The printable media of claim 1 wherein, in the image receiving layer, the ink optical density enhancement agent is present in an amount representing from about 5 to about 10 parts per 100 parts by total dry weight of the coating components present in the image receiving layer.

9. The printable media of claim 1 wherein the polymeric network is formed by using self-cross linked polyurethane polymers or cross-linkable polyglycidyl or polyoxirane resins.

10. The printable media of claim 1 wherein the polyalkene polymeric compounds are polytetrafluoroethylenes, polyamide or polyethylene polymer compounds.

11. The printable media of claim 1 that comprises a barrier layer that is deposited over the supporting substrate on the non-image side of the media.

12. The printable media of claim 1 wherein the supporting substrate and the image receiving layer form a textured surface on the image side of the printable media.

13. Method for forming the printable media of claim 1 comprising:

a. providing the supporting substrate, with the image side and the non-image side, including the fibers;

b. providing an image receiving layer composition by adding ink optical density enhancement agents into a mixture of pigment fillers and polymeric binders;

c. coating the image receiving layer composition on the image side of the supporting substrate to form an image receiving layer;

d. drying the coating layer under heat to form the printable media.

14. The method of claim 13 wherein the supporting substrate and the image receiving layer are embossed in order to obtain textured surfaces on the image side of the printable media.

15. The method of claim 13 wherein the supporting substrate contains a synthetic polymeric fiber as a first constituent material and a natural fiber as a second constituent material, or the supporting substrate comprises particulate inorganic substances, or the supporting substrate is a polymeric film substrate.

16. The method of claim 13 wherein, in the image receiving layer, the ink optical density enhancement agent comprises, at least, an ionene compound.

17. The method of claim 16 wherein the ionene compound is a cationic gelatin, cationic dextran, cationic chitosan, cationic cellulose, cationic cyclodextrin, carboxy-methyl chitosan, N, N, N -trimethyl chitosan chloride, alkoxylated quaternary polyamines, polyamines, polyamine salts, polyacrylate diamines, quaternary ammonium salts, polyoxyethylenated amines, quaternized polyoxyethylenated amines, poly-dicyandiamide, poly-diallyl-dimethyl ammonium chloride polymeric salt, quaternized dimethylaminoethyl (meth)acrylate polymers, polyethyleneimines, branched polyethyleneimines, quaternized poly-ethylenimine, polyurias, poly[bis(2-chloroethyl)ether-alt-1,3bis[3-(dimethylamino)propyl]urea], quaternized poly[bis(2-chloroethyl) ether-alt-1,3-bis[3-(dimethylamino)propyl], vinyl polymers or salts thereof, quaternized vinyl-imidazol polymers, modified cationic vinyl alcohol polymers, alkyl-guanidine polymers, or a combination thereof.

18. The method of claim 13 wherein, in the image receiving layer, the ink optical density enhancement agent is present in an amount representing from about 5 to about 10 parts per 100 parts by total dry weight of the coating components present in the image receiving layer.

19. The method of claim 13 further comprising depositing a barrier layer over the supporting substrate on the non-image side of the media.

* * * * *

UNITED STATES PATENT AND TRADEMARK OFFICE

CERTIFICATE OF CORRECTION

PATENT NO. : 10,471,691 B2
APPLICATION NO. : 15/741925
DATED : November 12, 2019
INVENTOR(S) : Xiaoqi Zhou et al.

It is certified that error appears in the above-identified patent and that said Letters Patent is hereby corrected as shown below:

In the Claims

In Column 25, Line 8, Claim 7, delete "3bis" and insert -- 3-bis --, therefor.

In Column 26, Line 27 approx., Claim 17, delete "3bis" and insert -- 3-bis --, therefor.

Signed and Sealed this
Third Day of March, 2020

Andrei Iancu
*Director of the United States Patent and Trademark Office*